US012716780B2

(12) United States Patent
Herjolfsson et al.

(10) Patent No.: US 12,716,780 B2
(45) Date of Patent: Aug. 25, 2026

(54) WIRELESS DATA LOGGER CONFIGURED TO MONITOR AT LEAST ONE ENVIRONMENTAL PARAMETER OF A SHIPMENT INCLUDING THE TEMPERATURE OF THE SHIPMENT, AND A METHOD OF OPERATING THE WIRELESS DATA LOGGER

(71) Applicant: CONTROLANT HF., Kopavogur (IS)

(72) Inventors: Gisli Herjolfsson, Kopavogur (IS); Erlingur Brynjulfsson, Reykjavik (IS); Thorsteinn Mar Arinbjarnarson, Kopavogur (IS)

(73) Assignee: CONTROLANT HF., Kopavogur (IS)

( * ) Notice: Subject to any disclaimer, the term of this patent is extended or adjusted under 35 U.S.C. 154(b) by 314 days.

(21) Appl. No.: 18/702,461

(22) PCT Filed: Oct. 18, 2022

(86) PCT No.: PCT/EP2022/078960
§ 371 (c)(1),
(2) Date: Apr. 18, 2024

(87) PCT Pub. No.: WO2023/066927
PCT Pub. Date: Apr. 27, 2023

(65) Prior Publication Data
US 2025/0264363 A1 Aug. 21, 2025

(30) Foreign Application Priority Data
Oct. 21, 2021 (EP) .................................... 21204006

(51) Int. Cl.
*G01K 1/022* (2021.01)
*G01K 1/024* (2021.01)
(Continued)

(52) U.S. Cl.
CPC ............. *G01K 1/022* (2013.01); *G01K 1/024* (2013.01); *G01K 3/14* (2013.01); *G01K 15/005* (2013.01)

(58) Field of Classification Search
CPC ........... G01K 1/022; G01K 1/024; G01K 3/14
See application file for complete search history.

(56) References Cited

U.S. PATENT DOCUMENTS 11,822,989 B2 * 11/2023 Volkerink ............. H04W 4/029
2006/0074586 A1 * 4/2006 Kautz ...................... G01K 7/42
374/E7.042
(Continued)

OTHER PUBLICATIONS

Extended European Search Report from corresponding EP Application No. 21204006, Apr. 8, 2022.
(Continued)

*Primary Examiner* — Laura Martin
*Assistant Examiner* — Philip L Cotey
(74) *Attorney, Agent, or Firm* — Workman Nydegger

(57) ABSTRACT

A wireless data logger, a method and a system for operating such a data logger, where the data logger is configured to monitor at least one environmental parameter of a shipment at least during transport of the shipment from an origin location to destination location, includes: a power source for powering the wireless data logger, a first sensing device configured for regularly measuring an environmental related parameter, a second sensing device configured for regularly measuring said environmental related parameter, a processor, and a communication module operated by the processor configured to transmit the at least one environmental parameter to an external data processing device. The measurement data from the first and the second sensing devices are processed by a processing device where the processing includes: comparing the measurement data from the first
(Continued)

sensing device with the measurement data from the second sensing device.

14 Claims, 4 Drawing Sheets

(51) Int. Cl.

*G01K 3/14* (2006.01)
*G01K 15/00* (2006.01)

(56) References Cited

U.S. PATENT DOCUMENTS

| | | | | |
|---|---|---|---|---|
| 2010/0100327 | A1* | 4/2010 | Jensen | G01K 1/024 340/539.3 |
| 2010/0289669 | A1* | 11/2010 | Saltzman | H04Q 9/00 340/870.17 |
| 2016/0116310 | A1* | 4/2016 | Brynjúlfsson | G06Q 10/08 340/870.07 |
| 2019/0073497 | A1* | 3/2019 | Burchell | G06K 7/10366 |
| 2019/0349213 | A1* | 11/2019 | Shive | G05B 15/02 |
| 2020/0072682 | A1* | 3/2020 | Rümler | G01K 7/427 |
| 2021/0088390 | A1* | 3/2021 | Kriss | F24F 11/49 |
| 2023/0029808 | A1* | 2/2023 | Nandula | G06Q 10/087 |

OTHER PUBLICATIONS

International Search Report from corresponding PCT Application No. PCT/EP2022/078960, Feb. 10, 2023.

* cited by examiner

WIRELESS DATA LOGGER CONFIGURED TO MONITOR AT LEAST ONE ENVIRONMENTAL PARAMETER OF A SHIPMENT INCLUDING THE TEMPERATURE OF THE SHIPMENT, AND A METHOD OF OPERATING THE WIRELESS DATA LOGGER

FIELD OF THE INVENTION

The present invention relates to a wireless data logger configured to monitor at least one environmental parameter of a shipment including the temperature of the shipment, and a method and a system for operating such wireless data logger.

BACKGROUND OF THE INVENTION

With the expansion and growth of global sourcing in a supply chain, more prevalent interest has been placed on automatic electronic time and monitoring of environment related parameters to increase food and drug safety and improve food defense systems throughout all areas of production, processing, storage and transportation and operations. Food and drug require proper handling of environment related parameters such as temperature during transport to assure shelf quality, longevity, and safety.

Data loggers are electronic monitoring devices commonly used for these purposes, namely, to automatically monitor and record various environmental related parameters of a shipment, such as temperature, humidity, acceleration and air pressure, over time. A recent example of importance of such data loggers is the temperature monitoring of some of the COVID-19 vaccine, where one of a key critical monitoring parameters during transport of the vaccine is the temperature. It is obviously essential that the temperature measurement (or any other measurements) is reliable and accurate at all times.

Data loggers used today are commonly calibrated regularly, depending on user requirements. This is typically done by the supplier of the data logger, where e.g. the temperature sensor of the logger is compared with a "master" temperature sensor that is highly accurate. A common frequency of calibrating the temperature sensor of such data loggers is once a year, or even every second year.

An inaccuracy in the temperature sensor, e.g. due to a drift/shift in the temperature measurement can be difficult or even impossible to identify during use of the data logger. This can obviously have a severe consequence where one and the same data logger may be used for several months or even over a year, while showing in-accurate or wrong measurement results. This in-accuracy or wrong results will only be identified when the data logger is re-calibrated.

This is both costly and time-consuming process, also considering that are millions of data loggers used on daily basis.

SUMMARY OF THE INVENTION

It is an object of embodiments of the invention to provide an improved data logger and a method and a system of operating such a data logger, where is possible to automatically identify if there is a need to re-calibrate the data logger and thus prevent transmission of in-accurate or false data from the data logger.

In general, the invention preferably seeks to mitigate, alleviate or eliminate one or more of the above-mentioned disadvantages of the prior art singly or in any combination. In particular, it may be seen as an object of embodiments of the present invention to provide a data logger and a method and a system for operating such a data logger that solves the above-mentioned problems, or other problems.

To better address one or more of these concerns, in a first aspect of the invention a wireless data logger is provided configured to monitor at least one environmental parameter of a shipment including temperature of the shipment at least during transport of the shipment from an origin location to a destination location, comprising:

- a power source for powering the wireless data logger,
- a first temperature sensor configured for regularly measuring a first temperature of the shipment,
- a second temperature sensor configured for regularly measuring a second temperature of the shipment,
- a processor,
- a memory configured to store measured temperature data from the first and the second temperature sensors,
- a communication module configured to transmit the at least one environmental parameter including the stored measured temperature data of the shipment to an external data processing device, where the communication module is operated by the processor including turning-on the communication module when it transmits stored measurement data to the external data processing device, and turning-off the communication module when it is not transmitting measurement data, and
- a housing,
- wherein the power source, the first temperature sensor, the processor, the memory and the communication module are arranged in the housing,
- wherein the second temperature sensor is arranged in the vicinity and adjacent to an outer side of the housing,
- wherein the measurement data from the first and the second temperature sensors are processed by the processor comprised in the data logger or by the external data processing device, where the processing includes:
  - comparing the first temperature data from the first temperature sensor measured within the housing with the second temperature data from the second temperature sensor measured outside and adjacent to the outer side of the housing, where in case the comparison results in a deviation exceeding a predefined limit,
  - issuing a re-calibration request command for the wireless data logger,
- wherein the processor is further configured to instruct the first temperature sensor to measure the environmental related parameter while the communication module is turned-off.

Accordingly, by implementing two temperature sensors, or even more than two, that both measure the ambience temperature of the shipment, it is possible to automatically identify any failures/defects in the first or second temperature sensor, e.g. due to drift/shift in the first or the second temperature sensor. The first and the second temperature sensors may as an example be of thermistor and/or platinum-resistor type, where the measured temperature is the ambience temperature of the shipment. Thus, if e.g. the shift between the two temperature sensors exceeds the pre-defined limit, e.g. more than 1.0° C. depending on the defined pre-defined limit, the re-calibration request command for the wireless data logger is issued.

If the shipment is drug placed in an isolated box to which the data logger is somehow attached to, the ambience temperature may be the temperature within the isolated box where the logger device is placed therein. If the shipment is in a container, e.g. placed on pallets, the ambience temperature is the temperature in the container.

Having the second sensor arranged at an outer side of the housing makes the second temperature measurement reliable and stable, and which makes the temperature independent of any excess heat from the components (communication module, processor etc.) of the data logger. The second temperature sensor may because of this be suitable to be used as a primary sensing device, meaning that the second measurement data may be the data utilized to track the temperature of the shipment in real time.

The primary component causing increase in the housing is when the communication module is transmitting measurement data, which may in one embodiment be understood when a modem comprised in the communication module is turned on. It is therefore of particular advantage that the first temperature measurements are performed when the communication module is automatically turned-off. Thus, most if not all excess heat from the communication module/modem, that would otherwise be present, will no longer disturb the first temperature measurement, which obviously makes the temperature measurement more accurate and reliable and thus prevents false positive in issuing said re-calibration request command for the wireless data logger.

The measurement data from the first and the second temperature sensors may be based on comparing individual temperature values together that was captured simultaneously, or within a certain time range.

The term power source may according to the present invention be understood as any preferably compact form of a power source, such as re-chargeable battery, e.g. lithium-ion or dry cell battery.

The wireless data logger may also be referred to a real time logger, such as multi-use data logger, or simply just a logger.

The wireless data logger may also be understood as IoT label or "smart-label" where the power source may contain ultra-thin flexible battery, e.g. a ZincPoly solid-state battery, where the thickness of the logger device may be within millimeter range.

In another embodiment, the measurement data from the first and the second temperature sensors may be based on comparing average measurement values from the first and/or the second temperature sensors, respectively. This may give a more reliable results than if individual measurement data are compared where e.g. sudden fluctuations in the measurement data may be reduced or eliminated. As an example, the ambience temperature may be measured every 10 minutes, whereas the other temperature sensor may be configured to measure the ambience temperature every 30 minutes, or even measuring the temperature once every hour. Thus, in the former case, the average value might thus be based on comparing the measured temperatures over an hour, the sum of six values divided with six, and in the latter case this would be the sum of the two values divided with two, or using the singe measurement value.

In another embodiment, the at least one environmental parameter transmitted to the external data processing device may further include humidity, light intensity, acceleration, vibration, shock, etc. of the shipment where it may be checked if the measured environmental parameter of the shipment is okey, e.g. the ambience temperature for the shipment is below/above certain pre-defined value or is within a certain range, or if the light intensity is above a pre-defined intensity target (e.g. box is open). An example of a possible scenario is where the shipment is e.g. drugs shipped in a refrigerated container where the ambience temperature is the temperature in the container. The target requirement, which is preferably pre-defined, may be that the temperature is below −25° C. at all times. Accordingly, if the measured temperature by the first and/or the second sensing device shows a temperature not in line with this requirement, an alarm signal would be triggered indicating that the refrigerated container is broken or that something went wrong.

In one embodiment, the data logger further comprises a Universal Serial Bus (USB) cable having one end being electrically connected to the wireless data logger and a USB connector at an opposite free end of the cable incorporated into a USB connector housing, where the USB cable is adapted to connect the wireless data logger to an external device such as a power source for charging the wireless data logger, wherein the second sensing device is a temperature sensor incorporated into the USB cable. Accordingly, a simple and secure solution is provided to isolate the second temperature sensor from it's surroundings that may otherwise affect the temperature measurement, and incorporate it into the data logger without being noticeable towards a user.

In one embodiment, the second temperature sensor is incorporated into the USB connector housing.

In one embodiment, the thickness of the USB cable housing at least partially circumferentially surrounds the temperature sensor and is adapted to a required response time for the temperature sensor incorporated into the USB cable housing. Accordingly, it is now possible to reduce the response time, i.e. the time until a stable temperature reading is obtained, by reducing the thickness of the USB cable housing, which may be made of plastic material, or casted plastic material.

In one embodiment, the USB cable housing is made of thermally conductive material such as a plastic material e.g. comprising thermally conductive material agents. Thus, the temperature response time may be further enhanced. Also, this may also be considered as another alternative where reducing the thickness of the USB cable housing may not be necessary.

In one embodiment, the temperature sensor is located adjacent to an outer surface of the USB cable housing. Thus, a simple solution is provided in reducing the temperature response time by placing the temperature sensor as close as possible to the inner surface of the USB cable housing.

In another embodiment, the thermally conducting material at least partially locally surrounds the temperature sensor. The thermally conducting material may as an example comprise any type of conducting elements, such as any type of metals or metal alloys, that may in one embodiment reach towards the surface of the USB cable housing.

In an embodiment, the temperature sensor may be, but is not limited to, Negative Temperature Coefficient (NTC) thermistor having a wired connection connected to a sensing circuitry comprised in the data logger, where the NTC thermistor (or any other type of temperature sensor) may be connected to a Wheatstone bridge where the change in the resistance may be converted into temperature values, e.g. using Steinhart-Hart relation.

In one embodiment, the communication module comprises a modem configured to communicated with the external data processing device via a cellular network, e.g. 2G, 3G, 4G or 5G network. Thus, said heat fluctuations in the housing is when the modem is turned on.

In one embodiment, the first temperature is positioned adjacent to the power source, e.g. said battery, where the first temperature sensor is further configured to measure the temperature of the power source while charging the wireless data logger, where the processor is connected to the first temperature sensor and is further configured to stop the charging when the temperature of the power source reaches a pre-defined temperature target limit.

In one embodiment, the second temperature sensor acts as a primary temperature sensor and is configured for measuring the ambience temperature with a fixed second pre-defined frequency, and where the first temperature sensor is configured for measuring the temperature with a fixed first pre-defined frequency. This frequency may be different, e.g. the second pre-defined frequency may be larger than the first pre-defined frequency. This may be relevant in the embodiment where the second temperature sensor is outside of the housing of the wireless data logger which makes the temperature measurement more reliable as already discussed. Accordingly, the second temperature sensor may be configured to measure the temperature every 10 minutes as an example, whereas the first temperature sensor may measure every 30 or 60 minutes as an example. This measurement frequency may also be the same, e.g. where the temperature measurements are performed in "pairs", i.e. measured simultaneously, or the measurement may not be performed in pairs, one measurement takes place each time.

In a preferred embodiment, the memory comprised in the wireless data logger may further be configured to store other measured data results processed by the processor. One of the roles of the memory is also to store measured data, that may e.g. not be possible to transmit by the communication module due to e.g. no cellular signal, but this is not uncommon when e.g. the shipment is on board of ship. There may in some instances be several days where there is no cellular signal. In such instances, the wireless data logger may check on a regular basis, e.g. every hour or every few hours if there is a cellular signal. When signal is detected, the previous collected data is transmitted to the data processing device, where the data is received and processed.

In one embodiment, the step of comparing the first measurement data from the first temperature sensor with the second measurement data from the second temperature sensor is regularly performed by the external data processing device, which may also be referred to as back-end device, including before and/or after transport from the origin location to the destination location. Thus, as an example, before the transport, where the data logger may be placed in a warehouse, it is regularly checked if the logger device is reliable or not and thus e.g. false temperature measurement may be prevented during the actual transport. The same may apply for some period after the shipment, although the data logger proved after closing the shipment to be okey, i.e. no significant drift/shift in the measurement data, something may happen e.g. few days/weeks after that, showing said deviation between the two (or more) sets of measurement data.

In one embodiment, the wireless data logger further comprises a temperature probe configured and designed to measure temperature at ultra-low temperature, such as below −50° C., in a closed compartment by placing the temperature probe into the closed compartment while monitoring the temperature of the shipment, while the remaining part of the data logger is outside the closed compartment.

In a second aspect of the invention, a system is provided configured to monitor at least one environmental parameter of a shipment including temperature of the shipment at least during transport from an origin location to a destination location using multiple of wireless data loggers, each of the wireless data loggers comprising:

a power source for powering the wireless data logger, a first temperature sensor configured for regularly measuring first temperature of the shipment, a second temperature sensor configured for regularly measuring second temperature of the shipment, a processor, a memory configured to store measured temperature data from the first and the second temperature sensors, a communication module configured to transmit the at least one environmental parameter including the stored measured temperature data shipment to an external data processing device, where the communication module is operated by the processor, where operating includes turning-on the communication module when it transmits at least some of the measurement data including the temperature to the external data processing device, and turning-off the communication module when it is not transmitting measurement data, and a housing, wherein the power source, the first temperature sensor, the processor, the memory and the communication module are arranged in the housing, wherein the second temperature sensor is arranged in the vicinity and adjacent to an outer side of the housing, wherein the system further comprises:

an external data processing device configured to:

receive measurement data from the first and the second temperature sensors transmitted by the communication module, compare the measurement data from the first temperature sensor with the measurement data from the second temperature sensor, where in case the comparison results in a deviation exceeding a pre-defined limit, issue a re-calibration request command for the wireless data logger wherein the processor is further configured to instruct the first temperature sensor to measure the environmental related parameter while the communication module is turned-off.

The issued re-calibration request command may be in any form of message informing either supplier of the method and/or the customer of the shipment that this particular data logger needs to be re-calibrated and may not be used before the re-calibration takes place.

In an embodiment, the temperature sensor that is calibrated is the second temperature sensor, which as mentioned previously may be incorporated into the USB cable. This is because this second temperature sensor preferably acts as a primary temperature sensor due to it's external location from the electrical components of the wireless data logger (e.g. heat originating from the communication module). The first temperature sensor may play an additional role, namely to monitor the temperature of the power source during charging, to determine when the power source has been fully charged.

In one embodiment, the step of comparing the resulting measurement data from the first temperature sensor with the resulting measurement data from the second temperature sensor includes comparing average measurement values from the first and/or the second temperature sensor together. As an example, the second temperature sensor may be configured to measure the ambience temperature, e.g. within an isolated box containing drugs, every 10 minutes, where the average value may be the average over one hour, and where the first temperature sensor may be configured to measure the temperature every 30 minutes. This should of course not be construed as being limited to these time values. The advantage of using average values is that temporal flux in the measurement data is eliminated, i.e. sudden temporal deviation in single values will not cause a "fake alarm".

In one embodiment, the step of defining the pre-defined limit includes comparing measurement values from the first temperature sensor and the second temperature sensor, preferably during or subsequent to calibration of the data logger, where difference between the resulting measurement data between the first temperature sensor and the second temperature sensor defines a reference benchmark between the two temperature sensor which is used as input in defining the pre-defined limit.

In a preferred embodiment, this is done where the temperature conditions are stable for both the temperature sensors.

As an example, the two measurement values may e.g. deviate by e.g. 2° C. during the calibration. Accordingly, what is relevant to consider is that this becomes the 2° C. reference benchmark for these two temperature sensors, meaning that it is important to consider if e.g. any deviation exceeds these 2° C. by x % may be considered as critical deviations. The pre-defined limit may thus e.g. be all values above 3° C.

The term shipment may according to the present invention include, but is not limited to, any type of drugs, food, and beverages.

The term monitoring at least one environmental parameter of a shipment may according to the present invention be understood as, in addition to measuring ambience temperature surrounding the wireless data logger, measuring humidity, acceleration, vibration, light intensity, or air pressure measured by the data logger. Accordingly, if the shipment is placed in e.g. an isolated box where e.g. temperature conditions are not extreme low and do not damage the data logger, then the data logger may be placed in the box, or if the shipment is placed in an isolated environment such as a container, then the data logger is in this isolated environment.

In one embodiment, the second temperature sensor comprises a temperature probe configured and designed to measure temperature at ultra-low temperature in a closed compartment by placing the temperature probe into the closed compartment while monitoring the temperature of the shipment, where during the monitoring the data logger and the first temperature sensor are outside the closed compartment, where the step of comparing the measurement data from the first temperature sensor with the measurement data from the second temperature sensor is performed prior to placing the temperature probe into the closed compartment, and/or after removing the temperature probe from the closed compartment, i.e. before the monitoring the temperature of the shipment starts and/or after completing the monitoring of the shipment.

It should be noted that such a wireless data logger is typically not designed to tolerate such an ultra-low temperature meaning that the use of such a temperature probe is preferred or necessary, with the data logger located outside the closed compartment. The term ultra-low temperature may be understood as a temperature that would potentially damage the wireless data logger. Accordingly, performing this comparison prior to or after the temperature monitoring of the shipment is the most optimal comparison. An example of a shipment is the vaccine from Pfizer®, where the vaccine must during transport stored at a temperature around of −80° C. In this case, the temperature measuring would be done before putting the probe into the closed compartment, or after taking the probe out of the close compartment (preferably after the temperature of the probe is stabilized). The large temperature gap between the wireless data logger and the actual measured temperature in the closed compartment would not give a meaningful result when comparing these two temperatures together during the shipment.

In one embodiment, the step of comparing the resulting measurement data from the first temperature sensor with the resulting measurement data from the second temperature sensor is performed upon or after arrival at the destination location, i.e. after closing the transport. Closing the transport may be understood as when the data logger is notified, e.g. automatically or manually, that the final destination location is reached and the data logger is no longer needed.

In another embodiment, the step of comparing the resulting measurement data from the first temperature sensor with the resulting measurement data from the second temperature sensor is performed during transport such as with regular time intervals. This may be of relevance where the transport time is long, e.g. several days, so as to identify timely that one of the sensing devices is not working properly.

The term transport from an origin location to a destination location may according to the present invention be understood as transport in a car/truck, with ships, aircrafts and any other type of transport.

In a fourth aspect of the invention the present invention relates to a cloud-enabled supply chain monitoring system including a wireless data logger, a supply chain system user interface to communicate with the real time logger and a cloud computing system which receives logger data via a cellular network from the real time logger. In another embodiment, the invention provides methods for cloud-enabled supply chain monitoring of shipment directed by a logger, e.g. such as said data logger or real time logger. In another embodiment, the invention is directed to a logger having sensors to communicate the environment conditions and events to the cloud platform, wherein the information is used for various purposes in the user interfaces and an automatic analysis process.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
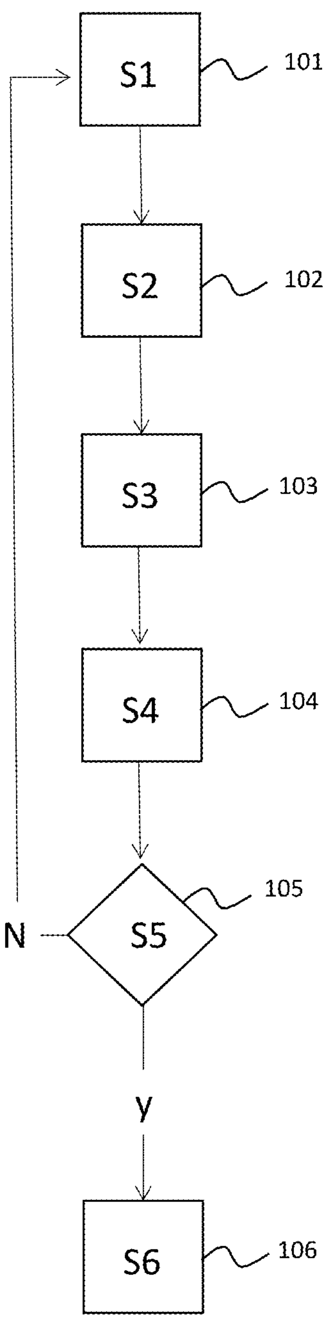
FIG. 1 shows a flowchart of an embodiment of a method according to the present invention of operating a wireless data logger configured to monitor at least one environmental parameter of a shipment, FIG. 2*a,b* illustrate graphically a scenario where a first and a second sensing devices are temperature sensors and where the resulting measurements are temperature measurements.

FIG. 1 shows a flowchart of an embodiment of a method according to the present invention of operating a wireless data logger comprising a housing and electrical components such as a processor, memory, communication module, and at least one sensor, where the data logger is configured to monitor at least one environmental parameter of a shipment including the temperature of the shipment at least during transport from an origin location to a destination location. The term wireless data logger may in the following also be understood as a real time logger, of any time including ultra-thin logger device sometimes referred to as IoT logger or smart logger, which may have thickness within millimeter range.

In step (S1) 101, a first temperature is measured by a first temperature sensor, where the first temperature sensor is arranged in the housing of the data logger.

In step (S2) 102, a second temperature is measured by a second temperature sensor, where the second temperature sensor is arranged in the vicinity and adjacent of the housing of the date logger and connected to the processor.

In step (S3) 103, the measured temperature is transmitted to an external data processing device. This transmitted measurement data may further include, in addition to the measured temperature of the shipment, humidity, acceleration, light intensity etc., everything that may affect the shipment.

In step (S4) 104, the resulting temperature measurements from the first temperature sensor is compared with the resulting temperature measurement data from the second temperature sensor. This comparison may be based on comparing average first and second temperature values, respectively, to make the comparison more reliable. Moreover, this step may be performed by the external data processing device.

In step (S5) 105, in case the comparison results in a deviation exceeding a pre-defined limit, a re-calibration command is issued (S6) 106 for the wireless data logger indicating that re-calibration is needed, and that the logger should not be used until it has been re-calibrated, otherwise in case of not exceeding the pre-defined limit, steps S1-S4 are repeated.

Although both the first and the second temperature sensors are configured to measure ambience temperature of the shipment, the fact that the first temperature sensor is arranged in the housing of the wireless data logger, and the second temperature sensor is arranged in the vicinity and adjacent to the outer side of the housing, with e.g. only few millimeters between, the temperature sensors are still both in different "environment" which makes the temperature comparison more reliable. To reduce temperature fluctuation within the housing, the measurement by the first temperature sensor is performed when the communication module is turned-off and no transmission is taking place. This is because the communication module (which e.g. comprises a modem) is the primary source of heat fluctuations when transmission is taking place.

The fact that the first and the second temperature sensors may vary up to some extent, in a way having slightly different character, or be different sensor types, a reference temperature benchmark may be defined during calibration of the first and the second temperature sensors. Thus, in case a deviation of x many degrees, e.g. 2° C., such difference is allowable by e.g. if it exceeds 3° C. or more (i.e. the 2° C. benchmark plus 1° C.) may be considered as exceeding said pre-defined limit.

The monitoring according to the present invention will mainly be based on monitoring drift/shift from this 2° C. temperature benchmark reference value to a larger deviation while using the data logger. If it exceeds a pre-defined value, e.g. 3° C. or more, this may be an indication that this particular data logger needs to be re-calibrated.

Figure 2A:
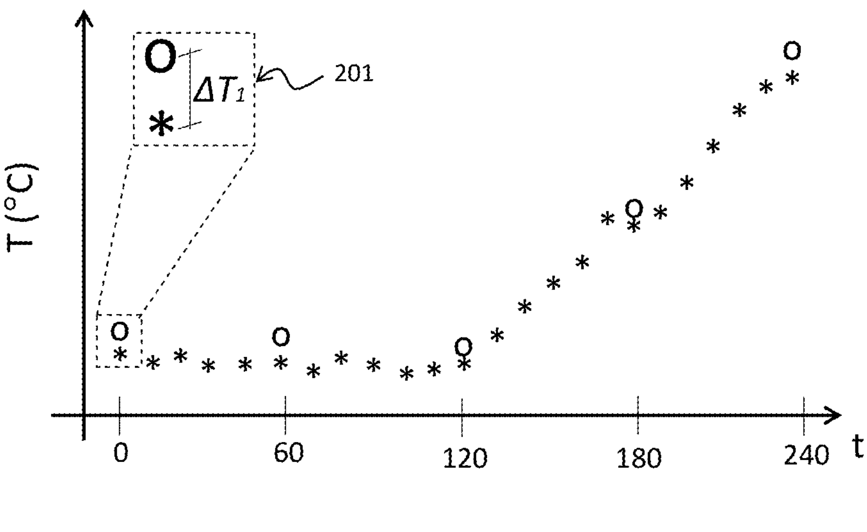

FIG. 2*a,b* illustrate graphically two scenarios for the first and the second temperature sensors.

As will be discussed in more details later, the "*" measurement data may originate from a second temperature sensor that acts as a primary temperature sensor that measures temperature values with a higher frequency rate that the "o" measurement data with a first temperature that may act as a secondary temperature sensor.

The zoomed-up view in FIG. 2*a* defines a reference temperature benchmark $\Delta T_1$ 201 between the two temperature sensors determined during calibration. The temperature sensors may be of thermistor type or be of platinum sensing resistor type, depending on the application, in particular the temperature range to be measured. This reference benchmark $\Delta T_1$ is a difference in the temperature measurements during calibration of the two temperature sensors.

The depicted temperature data shown in FIG. 2*a* shows an example of possible temperature evolution over time, during use of the data logger. The fact that there is no or insignificant trend/deviation between the two measurement data sets ("*" and "o") and that it is within the reference benchmark $\Delta T_1$ indicates that the measurement data from the data is reliable and that the data logger does not need any re-calibration.

Figure 2B:
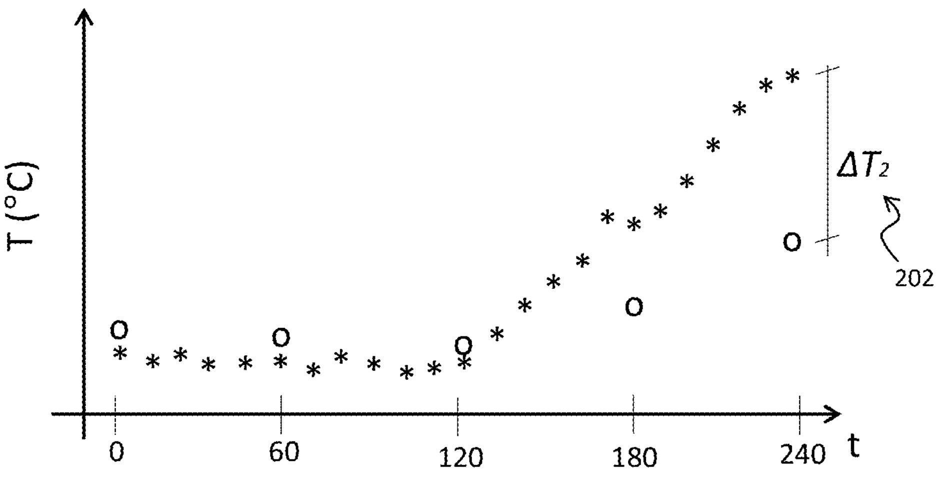

FIG. 2*b* illustrates graphically however a scenario where the deviation between the two temperature measurements during use of the logger (or another data logger) results in a deviation of $\Delta T_2$ 202 after 240 time units (can be hours/days/weeks) exceeding the pre-defined limit, which may be defined by an operator of the logger, e.g. if $\Delta T_2 > \Delta T_1 + 0.5°$ C. then the data loggers need a re-calibration. Such a drift/shift between the hypothetical measurement shown here would accordingly trigger and "alarm" that a re-calibration of the data logger is needed and that it should not be used until it has been re-calibrated.

Figure 3:
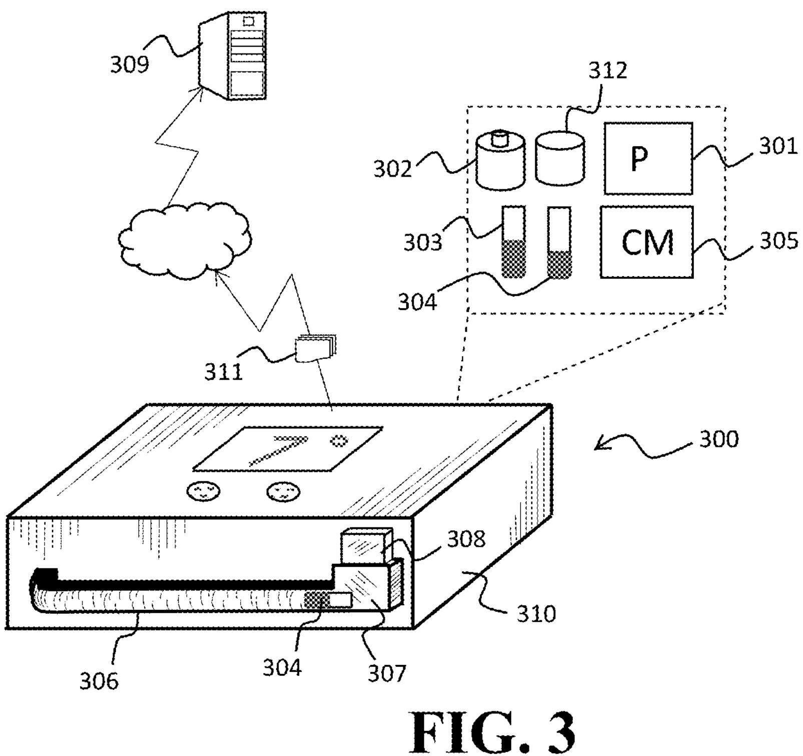
FIG. 3 shows on example of a wireless data logger according to the present invention configured to monitor at least one environmental parameter of a shipment.

FIG. 3 shows an example of a wireless data logger 300 according to the present invention configured to monitor at least one environmental parameter of a shipment, where the data logger comprises a power source 302 for powering the wireless data logger, a first temperature sensor 303 configured for regularly measuring a first ambience temperature, a second sensing device 304 configured for regularly measuring a second ambience temperature, a processor 301, a communication module 305 operated by the processor configured to transmit the temperature data to an external data processing device 309, and a memory 312 for e.g. storing all measured data.

The measurement data from the first and the second temperature sensors 303, 304 is processed by an external data processing device 309, where the processing includes comparing the measurement data from the first temperature sensor with the measurement data from the second temperature sensor. This may be done by calculating average values for the first and the second temperature sensors, respectively, where in case the comparison results in a deviation exceeding a pre-defined limit, a re-calibration request command is issued for the wireless data logger.

In an embodiment, the power source 302 and the first temperature sensor 303 is arranged in the housing 310, and the second sensing device 304 is arranged outside and in the vicinity of the housing 310.

In an embodiment, the wireless data logger further comprises a Universal Serial Bus (USB) cable 306 having a USB connector 308 at a free end of the cable incorporated into a connector housing 307, where the USB cable has one end being electrically connected to the wireless data logger and the other free end being adapted to connect the wireless data logger to an external device such as a power source for charging the wireless data logger. As shown in this embodiment, the second temperature sensor 304 is be incorporated into the USB cable or into the connector housing 307. By having the second temperature sensor outside the housing 310 is particularly beneficial because this external location makes the temperature measurements independent of possible temperature fluctuations or remaining temperature fluctuations in the housing and thus the temperature measurement becomes more reliable.

The first temperature sensor is placed within the housing 310 adjacent to the power source 302 and is, in addition to be configured to perform first temperature measurement, further configured to operate the increase in the power source 302 during charging, where the measured temperature is utilized by the processor 301 to stop the charging when the power source 302 is fully charged.

To minimize influence of temperature measurements by the first temperature sensor 303, but the primary temperature increase in the housing is when switching on the communication module 305 on when communicating with cellular network, the temperature measurements is performed, while the communication module is off or it in sleep mode, i.e. while it is not transmitting measurement data.

Figure 4:
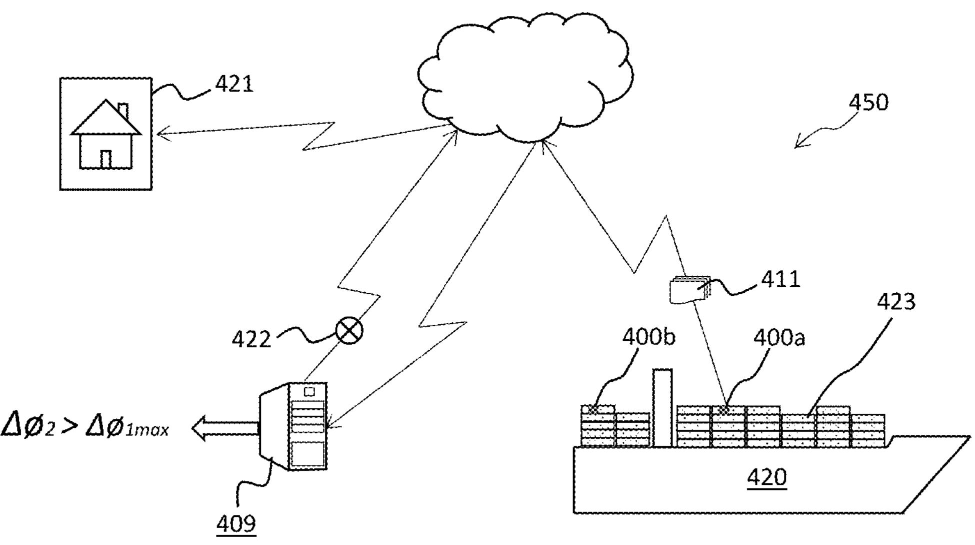
FIG. 4 shows an embodiment of a system according to the present invention monitor at least one environmental parameter of a shipment.

FIG. 4 shows an embodiment of a system 450 according to the present invention configured to monitor at least one environmental parameter of a shipment 423 including the temperature/ambience temperature of the shipment, where the shipment is in this example transported by a vessel 420, using multiple of wireless data loggers 400*a,b*, each of the wireless data loggers comprising a power source for powering the wireless data logger, a first temperature sensor configured for regularly measuring a first ambience temperature, a second temperature sensor configured for regularly measuring a second ambience temperature, a processor, a communication module operated by the processor configured to receive measurement data from the first and the second temperature sensors.

As depicted here, measurement data 411 from data logger 400*a* is transmitted to an external data processing device 409 where the measurement data from the first and the second temperature sensors are received and compared as discussed previously, where in case the comparison results in a deviation exceeding a pre-defined limit as discussed e.g. in relation to FIG. 2*a,b*, a re-calibration command 422 is issued stating that the data logger 400*a* is to be transported to a re-calibration station 421. This step may also be done at the arrival at the destination at the "closing" of the transport.

Figure 5:
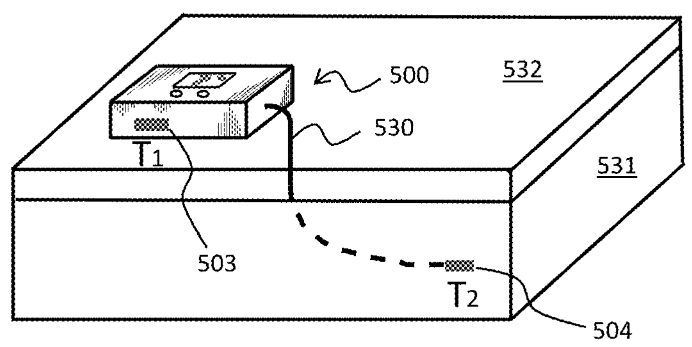
FIG. 5 illustrates graphically an embodiment where the first and the second sensing devices are temperature sensors, where the second temperature sensor comprises a temperature probe configured to measure temperature at ultra-low temperature in a closed compartment.

FIG. 5 illustrates graphically an embodiment where the second temperature sensor 504 comprises a temperature probe 530 configured to measure temperature at ultra-low temperature in a closed compartment, in this case a box 531 with a lid 532, and where the data logger 500 and the first temperature sensor 503 are outside the closed compartment, e.g. somehow attached to the lid 532, and the temperature probe extends into the box 531. It should be noted that such a wireless data logger is typically not designed to tolerate such an ultra-low temperature, e.g. below −50° C., meaning that the use of such a temperature probe is preferred or necessary, with the data logger located outside the closed compartment.

The temperature probe may also be considered as being a third temperature sensor, in addition to the first and the second temperature sensors as discussed in relation to FIG. 3.

Figure 6A:
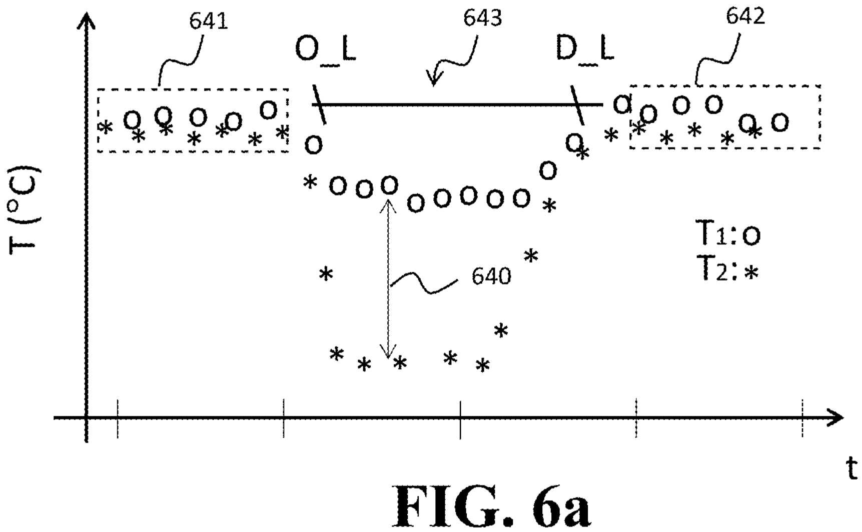
FIG. 6*a* illustrates graphically a time-line showing time-window from starting at origin location (O_L) until ending at a destination location (D_L), where the time-window where the ultra-low temperature take place.

FIG. 6*a* illustrates graphically a time-line t, where the time-window 643 is the time starting at origin location (O_L) and ending at a destination location (D_L), namely the time-window where the ultra-low temperature monitoring takes place. This can be several hours, or several days, even weeks.

The time windows 641 and 642 are before and after starting the transport (e.g. aircraft, ship, car) of the shipment, i.e. when the temperature probe 504 is not in the closed compartment.

Due to the fact that it is only the temperature probe 530 that measures the ultra-low temperature, whereas the data logger is on the lid of the box, the temperature measurements from the probe 530 (marked as "*") falls drastically compared to the temperature measurement from the first temperature sensor 503 (marked as "o") as indicated by arrow 640. In such scenarios, the step of comparing the resulting measurement data from the first sensing device with the resulting measurement data from the second sensing device, i.e. the temperature probe 530, is performed either in the time window 641, namely before, or in the time window 642 after the low-temperature monitoring measurements.

Figure 6B:
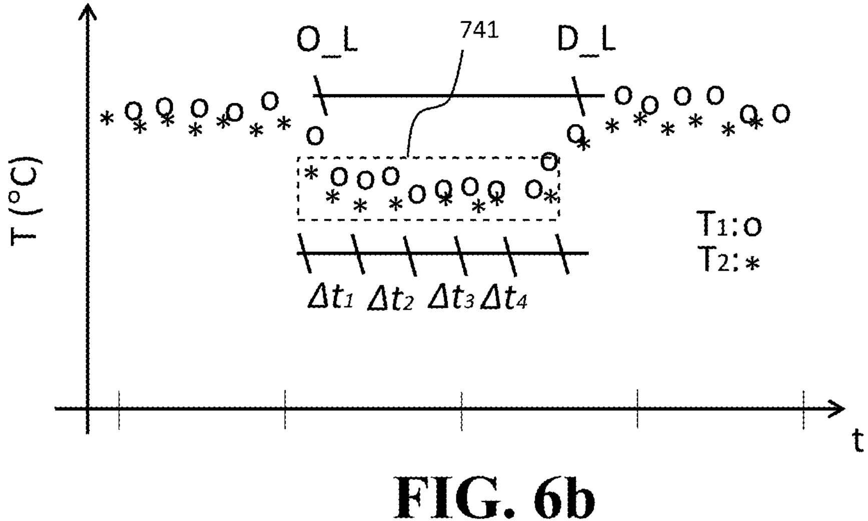
FIG. 6*b* illustrates graphically similar time-line as shown in FIG. 6, but where the temperature measurement is not extreme low as illustrated in FIG. 6*a*.

FIG. 6*b* illustrates graphically similar time-line as shown in FIG. 6*a*, but where the temperature measurement is not extreme low as illustrated in FIG. 6, where the logger 500 is placed where in the same space as where the temperature the shipment is measured. This could e.g. be a container, or transport vehicle and the like, where the data logger is accordingly in the container or in the transport. The fact that both the temperature sensors are in the same space, the step of comparing the resulting measurement data from the first temperature sensor with the resulting measurement data from the second temperature sensor is performed during transport time-window 741, which may be done upon arrival at the destination location D_L, or e.g. as shown here with regular time intervals Δt1 . . . n, which could e.g. be every 6 hours depending on transport.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A wireless data logger configured to monitor at least one environmental parameter of a shipment including temperature of the shipment at least during transport of the shipment from an origin location to a destination location, comprising:

a power source for powering the wireless data logger, a first temperature sensor configured for regularly measuring a first temperature of the shipment, a second temperature sensor configured for regularly measuring a second temperature of the shipment, a processor, a memory configured to store measured temperature data from the first and the second temperature sensors, a communication module configured to transmit the at least one environmental parameter including the stored measured temperature data of the shipment to an external data processing device, where the communication module is operated by the processor, where the operating includes turning-on the communication module when it transmits at least some of the measurement data including the stored measured temperature data of the shipment to the external data processing device, and turning-off the communication module when it is not transmitting measurement data, and a housing, wherein the power source, the first temperature sensor, the processor, the memory and the communication module are arranged in the housing, wherein the second temperature sensor is arranged in the vicinity and adjacent to an outer side of the housing, wherein the measurement data from the first and the second temperature sensors are processed by the processor comprised in the data logger or by the external data processing device, where the processing includes:

comparing the first temperature data from the first temperature sensor measured within the housing with the second temperature data from the second temperature sensor measured outside and adjacent to the outer side of the housing, where in case the comparison results in a deviation exceeding a pre-defined limit, issuing a re-calibration request command for the wireless data logger, wherein the processor is further configured to instruct the first temperature sensor to measure the environmental related parameter while the communication module is turned-off.

2. The wireless data logger according to claim 1, further comprising a Universal Serial Bus (USB) cable having one end being electrically connected to the wireless data logger and a USB connector at an opposite free end of the cable incorporated into the cable and/or a connector housing, where the USB cable is adapted to connect the wireless data logger to an external device such as a power source for charging the wireless data logger, wherein the second sensing device is a temperature sensor incorporated into the USB cable such as into the connector housing.

3. The wireless data logger according to claim 1, wherein the first temperature sensor is positioned adjacent to the power source where the first temperature sensor is further configured to measure the temperature of the power source while charging the wireless data logger, where the processor is connected to the first temperature sensor and is further configured to stop the charging when the temperature of the power source reaches a pre-defined temperature target limit.

4. The wireless data logger according to claim 1, wherein the second temperature sensor acts as a primary temperature sensor and is configured for measuring the temperature with a fixed second pre-defined frequency, and where the first temperature sensor is configured for measuring the temperature with a fixed first pre-defined frequency, the second pre-defined frequency being higher than the first pre-defined frequency.

5. The wireless data logger according to claim 1, wherein the communication module comprises a modem configured to communicated to the external data processing device via a cellular network.

6. A system configured to monitor at least one environmental parameter of a shipment including temperature of the shipment at least during transport from an origin location to a destination location using multiple of wireless data loggers, each of the wireless data loggers comprising:

a power source for powering the wireless data logger, a first temperature sensor configured for regularly measuring first temperature of the shipment, a second temperature sensor configured for regularly measuring second temperature of the shipment, a processor, a memory configured to store measured temperature data from the first and the second temperature sensors, a communication module configured to transmit the at least one environmental parameter including the stored measured temperature data of the shipment to an external data processing device, where the communication module is operated by the processor, where operating includes turning-on the communication module when it transmits at least some of the measurement data including the temperature to the external data processing device, and turning-off the communication module when it is not transmitting measurement data, and a housing, wherein the power source, the first temperature sensor, the processor, the memory and the communication module are arranged in the housing, wherein the second temperature sensor is arranged in the vicinity and adjacent to an outer side of the housing, wherein the system further comprises:

an external data processing device configured to:

receive measurement data from the first and the second temperature sensors transmitted by the communication module, compare the measurement data from the first temperature sensor with the measurement data from the second temperature sensor, where in case the comparison results in a deviation exceeding a pre-defined limit, issue a re-calibration request command for the wireless data logger wherein the processor is further configured to instruct the first temperature sensor to measure the environmental related parameter while the communication module is turned-off.

7. The system according to claim 6, where the step of comparing the resulting measurement data from the first sensing device with the resulting measurement data from the second sensing device is regularly performed by the external data processing including before and/or after the transport from the origin location to the destination location.

8. A method of operating a wireless data logger configured to monitor at least one environmental parameter of a shipment at least during transport of the shipment from an origin location to destination location, comprising:

measuring, by a first temperature sensor, a first temperature of the shipment, measuring, by a second temperature sensor, a second temperature of the shipment, transmitting, by a communication module the measured temperature data to an external data processing device, comparing the resulting temperature data from the first temperature sensor with the resulting measurement data from the second temperature sensor, where in case the comparison results in a deviation exceeding a pre-defined limit, issuing a re-calibration request command for the wireless data logger wherein the first temperature sensor is arranged in a housing of the wireless data logger and the second temperature sensor is arranged in the vicinity and adjacent to an outer side of the housing, wherein the measurement by the first temperature sensor is performed when the communication module is turned-off and no transmission is taking place.

9. The method according to claim 8, wherein the step of comparing the resulting measurement data from the first temperature sensor with the resulting measurement data from the second temperature sensor includes comparing average temperament measurement values from the first and/or the second temperature sensor together.

10. The method according to claim 8, wherein the temperature of the shipment is the ambience temperature surrounding the shipment.

11. The method according to claim 8, wherein the step of defining the pre-defined limit includes comparing measurement values from the first temperature sensor and the second temperature sensor during calibration of the data logger, where difference between the resulting measurement data between the first temperature sensor and the second temperature sensor defines a reference temperature benchmark between the two sensing devices configured to be utilized as input in defining the pre-defined limit.

12. The method according to claim 8, wherein the second temperature sensor comprises a temperature probe configured to measure temperature at ultra-low temperature in a closed compartment by placing the temperature probe into the closed compartment while monitoring the temperature of the shipment, where during the monitoring the data logger and the first temperature sensor are outside the closed compartment, where the step of comparing the measurement data from the first temperature sensor with the measurement data from the second temperature sensor is performed prior to placing the temperature probe into the closed compartment, and/or after removing the temperature probe from the closed compartment.

13. The method according to claim 8, wherein the step of comparing the resulting measurement data from the first temperature sensor with the resulting measurement data from the second temperature sensor is performed upon or after arrival at the destination location.

14. The method according to claim 8, wherein the step of comparing the resulting measurement data from the first temperature sensor with the resulting measurement data from the second temperature sensor is performed during transport such as with regular time intervals.

* * * * *